United States Patent [19]

Lee et al.

[11] Patent Number: 4,921,880
[45] Date of Patent: May 1, 1990

[54] ADHESION PROMOTER FOR UV CURABLE SILOXANE COMPOSITIONS AND COMPOSITIONS CONTAINING SAME

[75] Inventors: Chi-Long Lee; Michael A. Lutz, both of Midland, Mich.

[73] Assignee: Dow Corning Corporation, Midland, Mich.

[21] Appl. No.: 232,204

[22] Filed: Aug. 15, 1988

[51] Int. Cl.$^5$ .................. C08G 77/12; C08G 77/28
[52] U.S. Cl. ........................... 522/12; 522/83; 522/99; 522/148; 528/17; 528/30; 528/31; 528/32; 528/901
[58] Field of Search ............. 522/99, 148, 12, 83; 523/17, 18, 901, 31, 32, 30

[56] References Cited

U.S. PATENT DOCUMENTS

| | | | |
|---|---|---|---|
| 4,052,529 | 10/1977 | Bokermann et al. | 522/99 |
| 4,064,027 | 12/1977 | Gant | 204/159.13 |
| 4,099,837 | 7/1978 | Vakirani | 350/96.29 |
| 4,276,424 | 6/1981 | Peterson | 556/430 |
| 4,314,956 | 2/1982 | Baney | 264/65 |
| 4,324,901 | 4/1982 | West | 556/430 |
| 4,486,504 | 12/1984 | Chung | 522/99 |
| 4,528,081 | 7/1985 | Lien et al. | 522/99 |
| 4,595,471 | 6/1986 | Preiner et al. | 528/17 |
| 4,608,270 | 8/1986 | Varaprath | 427/35 |
| 4,659,851 | 4/1987 | Plueddemann | 556/431 |
| 4,689,085 | 8/1987 | Plueddemann | 106/287.14 |
| 4,719,262 | 1/1988 | Plueddeman | 525/105 |
| 4,735,971 | 4/1988 | Inoue et al. | 522/42 |
| 4,737,562 | 4/1988 | Chaudhurg | 528/15 |
| 4,741,931 | 5/1988 | Lin et al. | 427/387 |
| 4,742,092 | 5/1988 | Inoue et al. | 522/27 |
| 4,780,486 | 10/1988 | Lee et al. | 522/14 |
| 4,824,875 | 4/1989 | Gutek | 522/9 |

OTHER PUBLICATIONS

Stewart E. Miller and Alan G. Chyroweth, Optical Fiber Telecommunication, Academic Press 1979, pp. 299, 314–316.

*Primary Examiner*—John C. Bleutge
*Assistant Examiner*—Ralph H. Dean, Jr.
*Attorney, Agent, or Firm*—Roger H. Borrousch

[57] ABSTRACT

An adhesion promoter for use with ultraviolet radiation curable siloxane composition is made by combining an alkoxysilicon compound of the formula

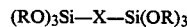

$(RO)_3Si-X-Si(OR)_3$ and a compound capable of catalyzing the reaction between two alkoxy groups or an alkoxy group and a hydroxyl group. Ultraviolet radiation curable siloxane compositions with the improved adhesion are obtained by mixing the adhesion promoter with a mixture which has at least one ultraviolet radiation activatable siloxane polymer and a photoinitiator. These compositions can be used as optical fiber coatings, conformal coatings, and other coating application where adhesion to a substrate is important.

23 Claims, No Drawings

ADHESION PROMOTER FOR UV CURABLE SILOXANE COMPOSITIONS AND COMPOSITIONS CONTAINING SAME

BACKGROUND OF THE INVENTION

1. Field of the Invention

This invention relates to an adhesion promoter for use in ultraviolet radiation curable siloxane compositions and the resulting compositions containing same.

2. Background Information

The use of certain silanes as coupling agents to enhance the adhesion of a variety of organic and silicone compositions to substrates is known in the art. While these known silanes and certain other silicon containing compounds do function as coupling agents and adhesion promoters, they do not function equally in all situations. Whether a particular silane is useful as an adhesion promoter can depend on the type of substrate, the type of composition or material being bonded to the substrate, and the conditions under which the adhesive bond is to perform. Included in these silane coupling agents are those which have organofunctional groups bonded to the silicon atom, such as a vinyl functional group, vinyl or methacrylate and also bonded to the silicon atom are hydrolyzable groups, such as methoxy or ethoxy.

The silane coupling agents have found use in certain ultraviolet radiation curable compositions, such as described by Blyler et al, in Chapter 10, of "Optical Fiber Telecommunications", by Miller et al, Academic Press, 1979, pages 314 to 316. Blyler et al state that the requirements for coupling agents are that they have two functionalities, one capable of interacting with the resin phase and one favoring reaction with the substrate. Blyler et al are specifically discussing coupling agents for use in UV curing epoxy acrylate and specifically suggest using a styrene-functional amine hydrochloride silane of the formula

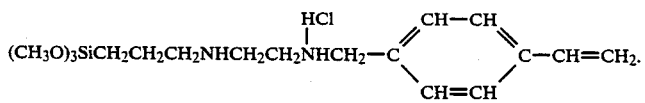

The functional organic moiety such as the vinyl group may form covalent bonds with the corresponding reactive groups in the resin phase, leading to a bond which should provide a high degree of water resistance.

Vazirani in U.S. Pat. No. 4,099,837, issued Jul. 11, 1978, teaches that coupling agents can be used in UV cured epoxy-acrylate coatings. Vazirani reports that the most effective coupling agents for fiber coating also have unsaturated sites that attach to the polymer and improve the bond between the polymer coating and the glass surface and that coupling agents proposed for optical fiber coatings are typically silanes and titanates. Vazirani specifically uses the styrene-function amine hydrochloride silane described by Blyler et al.

The need for an adhesion promoter useful in ultraviolet radiation curable compositions is present today. The inventors being faced with the problem of increasing the adhesion of UV curable siloxane compositions to a variety of substrates undertook an investigation which lead to the present inventive solution. The adhesion sought was of the unprimed nature, such that the UV curable composition applied to a substrate would develop the required adhesion without the use of a primer. The adhesion should develop faster after cure of the composition has taken place, instead of like some situations of the prior art in which substantial period of time are required before the desired adhesion is obtained. The adhesion developed should be strong enough that the cured composition exhibits cohesive failure. Other characteristics of the desired adhesion were that it should retain its strength under high moisture conditions and it should not be corrosive to electrical and electronic devices.

An area where adhesion is needed is the optical fiber communications industry. The optical fibers carry the information by light waves. These fibers are made of glass coated with a primary coating to preserve the strength and performance of the fiber by protecting it from adverse mechanical, thermal, and chemical environments. Current commercially available ultraviolet radiation curable coatings are deficient with respect to adhesion of the primary coating to the glass surface. This industry can use two kinds of adhesion, namely strong adhesion and controlled adhesion. In the case of controlled adhesion, the coating should adhere to the glass fiber, but not so strongly so that it will not come off mechanically when desired during subsequent operations. One major limitation of current commercially available organic optical fiber coatings is their poor adhesion in the presence of moisture. Ultraviolet radiation cured silicone optical fiber coatings have poor adhesion to glass. In the case of strong adhesion meaning a bond which exhibits cohesive failure, the interface between the glass and coating is strong enough that the coating is removable by chemical means during subsequent operations rather than by mechanical means. This type of adhesion should also remain in the presence of moisture.

SUMMARY OF THE INVENTION

An adhesion promoter with the above characteristics was unexpectedly found for use with ultraviolet radiation curable siloxane compositions. This newly discovered adhesion promoter did not follow the concept believed to be required for adhesion promoters as illustrated by the prior art described above.

This invention relates to an adhesion promoter for ultraviolet radiation curable siloxane compositions having a combination consisting of (A) an alkoxysilicon compound having a general formula

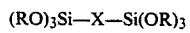

in which R is methyl or ethyl and X is a divalent radical selected from the group consisting of —(CH$_2$)$_n$— where n has a value of from 1 to 10 inclusive and —O(R'$_2$SiO)$_m$— where each R' is independently selected from a group consisting of RO—, an aliphatic hydrocarbon radical, and an aromatic hydrocarbon radical, where m has a value of from 0 to 20 inclusive, and (B) a compound capable of catalyzing a reaction between two ≡SiOR groups in the presence of atmospheric moisture or between ≡SiOR and a hydroxyl group on a substrate.

The adhesion promoter can be used to make ultraviolet radiation curable siloxane compositions which cure in a few seconds by exposure to ultraviolet radiation and give elastomeric film with excellent unprimed adhesion to various substrates.

The adhesion promoters of the present invention overcome the deficiencies described above for use in the optical fiber communications industry. This adhesion promoter provides adhesion to glass optical fibers both in the presence and absence of moisture. The adhesion is observed by the improvement in performance under mechanical, thermal, and chemical stress. The adhesion develops at room temperature over a period of time, such as within 30 minutes after exposure to ultraviolet radiation to cure a coating composition.

This invention also relates to an ultraviolet radiation curable siloxane composition comprising (I) a mixture comprising at least one ultraviolet radiation activatable siloxane polymer which will cure when exposed to ultraviolet radiation by forming a crosslinked product and a photoinitiator which is activated by ultraviolet radiation, and (II) the combination described hereinbefore as the adhesion promoter for ultraviolet radiation curable compositions.

DESCRIPTION OF THE PREFERRED EMBODIMENTS

The adhesion promoters of the present invention are specifically designed to provide their adhesive characteristics when used in siloxane compositions which are curable by exposure to ultraviolet radiation. The adhesion promoter is a combination of two ingredients, (A) an alkoxysilicon compound of the general formula (RO)$_3$Si—X—Si(OR)$_3$ in which R is methyl or ethyl and X is a divalent radical selected from —(CH$_2$)$_n$— and —O(R'$_2$SiO)$_m$— where each R' is independently selected from RO—, an aliphatic hydrocarbon radical, and an aromatic hydrocarbon radical, n has a value of 1 to 10 inclusive and m has a value of 0 to 20 inclusive, and (B) a compound capable of catalyzing a reaction between two ≡SiOR groups in the presence of atmospheric moisture or between ≡SiOR and a hydroxyl group on a substrate.

The alkoxysilicon compounds of (A) where X is —(CH$_2$)$_n$— can be illustrated by bis(trimethoxysilyl)ethane, bis(trimethoxysilyl)propane, bis(triethoxysilyl)ethane, bis(triethoxysilyl)propane, bis(trimethoxysilyl)butane, bis(trimethoxysilyl)isobutane, bis(triethoxysilyl)hexane, and bis(trimethoxysilyl)decane. These compounds can be synthesized by reacting chloroalkyltrialkoxysilane with tetraalkoxysilane in the presence of lithium. Such methods are well known in the art.

The alkoxysilicon compounds of (A) where X is —O(R'$_2$SiO)$_m$— can be illustrated by silicon compounds of the following formulae:

(CH$_3$O)$_3$SiOSi(OCH$_3$)$_3$,

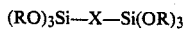
(CH$_3$O)$_3$SiO(SiO)$_p$Si(OCH$_3$)$_3$,

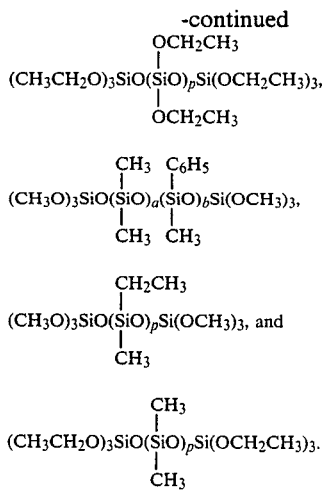

In the above formulae, p has an average value of from 1 to 20 and a has an average value of from 0 to 19 and b has an average value of from 1 to 20 with the sum of a plus b being 1 to 20.

The adhesion promoters which provide the best results are those made using bis-(trimethoxysilyl)ethane, which has the formula

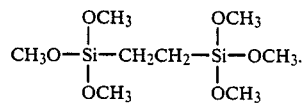

The compound which acts as a catalyst, ingredient (B), is a compound which causes a reaction between two silicon-bonded alkoxy groups, such as an organotin compound or an organotitanate. Ingredient (B) can also be compounds which cause a reaction between a silicon-bonded alkoxy group and a hydroxyl group on a substrate, which can also include the organotin compounds and organotitanates. Of the compounds of ingredient (B), the organotitanates are preferred because they provide the optimum adhesion properties.

Ingredient (B) can be an organotin compound such as stannous carboxylates or diorganotin dicarboxylates. Stannous carboxylates can be illustrated by stannous octoate, stannous 2-ethylhexoate, stannous neodecanoate, stannous isooctanoate, stannous isodecanoate, and stannous 2'2'-dimethyldecanoate. Diorganotin dicarboxylates can be illustrated by dibutyltin diacetate, dibutyltin dilaurate, dibutyltin dioctoate, and dimethyltin dilaurate.

Ingredient (B) can be an organotitanate such as a tetraalkyltitanate which can be illustrated by tetrabutyltitanate, tetraisopropyltitanate, tetramethyltitanate, and tetraoctyltitanate or a chelated titanium compound such as those of the formulae

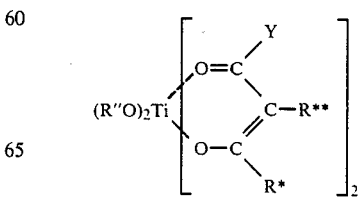

and

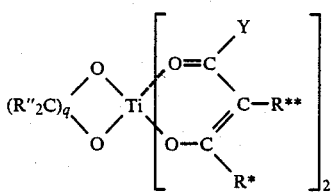

in which R″ is an alkyl radical, Y is an alkyl radical, a hydrogen atom, an alkoxy radical, or amino radical, R* is an alkyl radical or a —(CH$_2$CH$_2$)— bonded to the —(CH$_2$CH$_2$)— of R, R is an alkyl radical, a hydrogen atom, acetyl radical, or a —(CH$_2$CH$_2$)— bonded to the —(CH$_2$CH$_2$)— of R*, q is an integer of from 2 to 6 inclusive. Examples of the chelated titanium compounds are diisopropoxy titanium bis-(ethyl acetoacetonate), diisopropoxy titanium bis-(methyl acetoacetonate), diisopropoxy titanium bis-(acetylacetonate), dibutoxy titanium bis-(ethyl acetoacetonate), dimethoxy titanium bis-(methyl acetoacetonate),

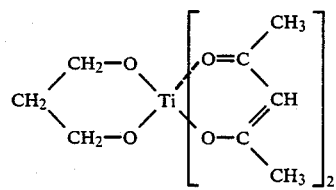

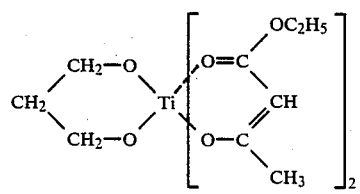

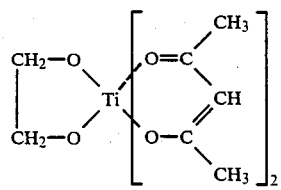

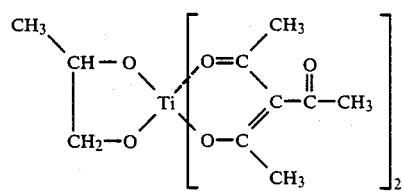

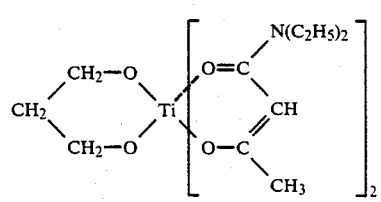

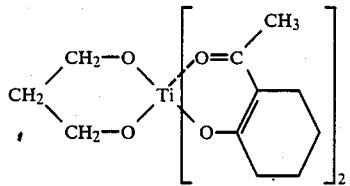

Of the preferred organotitanates, tetrabutyltitanate is the most preferred as ingredient (B).

The adhesion promoter can be made by blending the two ingredients, namely (A) and (B), and then adding the resulting blend to a radiation curable mixture (I) or ingredient (A) and ingredient (B) can be added to mixture (I) separately. The technique of separate addition is preferred because this offers the most flexibility in controlling the adhesion between a substrate and cured product. The optimum adhesion can be adjusted by changing the ratio of (A) to (B) and the total amount of (A) plus (B) added to mixture (I). Ingredient (A) is sensitive to moisture, such as atmospheric moisture, and should be handled under conditions which essentially exclude moisture. When blending (A) and (B), the materials should be handled so as not to contact atmospheric moisture, and the blending process should be such that it excludes the introduction of moisture or water because the alkoxy groups on the silicon atoms will hydrolyze, especially in the presence of a catalyst of (B). When ingredient (B) is an organotitanate, it too is sensitive to moisture and should be handled like ingredient (A). The relationship between the amounts of (A) and (B) are such that in the combination where (A) plus (B) is equal to 100 weight percent, (A) can be from 15 to 98 weight percent and (B) from 2 to 85 weight percent, with the preferred amounts being such that (A) is from 55 to 90 weight percent and (B) is from 10 to 45 weight percent.

The combination of (A) and (B), which is the same as adhesion promoter (II), is used to promote adhesion in ultraviolet radiation curable siloxane compositions where the amount is such that the desired adhesion is achieved. The degree of adhesion will vary with the amount of total combination used, with the ratio of the weight of (A) to (B), with the nature or kind of ultraviolet radiation curable mixture (I) being used. Preferably, the adhesion promoter is used in amounts of from 0.15 to 3.5 weight percent based on the weight of mixture (I). The most preferred amounts of adhesion promoter used are from 1 to 2.5 weight percent.

The combination which is the adhesion promoter when used in a ultraviolet radiation curable siloxane composition promotes the adhesion to substrates when the curable composition is cured in contact with the substrate. The ultraviolet radiation curable siloxane composition of this invention is obtained when a mixture (I) which is curable by exposure to ultraviolet radiation and the adhesion promoter (II) are present in the composition.

Mixture (I) is at least one ultraviolet radiation activatable siloxane polymer which will cure when exposed to ultraviolet radiation and form crosslinked product in the presence of photoinitiator which is activated by ultraviolet radiation. This mixture can contain other siloxane ingredients, organic compounds, reinforcing agents, and other compounds which are used with such siloxane compositions.

One curable material which is useful as mixture (I) comprises (a) a vinyl functional polydiorganosiloxane in which there is at least two vinyl functional groups per molecule, (b) a mercapto functional compound having at least two mercapto groups per molecule. In this mixture, the number of vinyl groups per molecule plus the number of mercapto groups per molecule is at least five to obtain satisfactory cure. These curable materials can be illustrated by a preferred embodiment described by Chi-long Lee and Michael A. Lutz in copending application Ser. No. 863,672, filed May 15, 1986, assigned by the same assignee as the present application, entitled "Fast Ultraviolet Radiation Curable Composition" and which is hereby incorporated by reference to show these curable materials and their preparation. These compositions are hereinafter identified as vinyl/mercapto compositions.

The vinyl/mercapto composition comprises a material which is storable in one package, is viscosity stable indicated by the failure of the 25° C. viscosity to double when heated at 100° C. for 24 hours, cures when exposed to ultraviolet radiation of 70 millijoules or less per square centimeter in one second or less where the ultraviolet radiation includes a wavelength of 365 nanometres, and is obtained by mixing (i) alkenyl functional, linear triorgano-siloxy endblocked polydiorganosiloxane having a degree of polymerization of 30 to 1,000 where each silicon-bonded organic radical is selected from vinyl, methyl, phenyl, 3,3,3-trifluoropropyl, beta-(cyclohexenyl)ethyl, ethyl, cyclohexenyl, allyl, higher alkenyl radicals represented by the formula —A(CH$_2$)$_r$CH=CH$_2$ wherein A is —(CH$_2$)$_s$— or —(CH$_2$)$_t$(CH=CH—, r has a value of 1, 2, or 3; s has a value of 3 or 6; and t has a value of 3, 4, or 5, and silacyclopentenyl, and having per molecule at least two siliconbonded organic radicals selected from vinyl, beta-(cyclohexenyl)ethyl, cyclohexenyl, allyl, higher alkenyl radical and silacyclopentenyl, (ii) mercapto functional crosslinker which is at least one material selected from mercapto functional polyorganosiloxanes and mercapto organic compounds, said mercapto functional polyorganosiloxanes are represented by the general formula

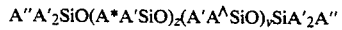

wherein each A^ is selected from mercaptoalkyl radicals having from 2 to 6 carbon atoms per radical; each A' is selected from methyl, phenyl, 3,3,3-trifluoropropyl, and ethyl; and each A" is selected from the radicals of —OH, A^, and A'; and each A* is selected from methyl and phenyl, on the average there being per molecule at least two mercaptoalkyl radicals, z is 0 or greater, v is 0 or greater, and the amount and kind of organic radicals represented by A^, A', A", and A* being of such a nature as to make (i) and (ii) compatible, and said mercapto organic compounds have at least two mercapto groups per molecule, consisting of atoms of sulfur, carbon, and hydrogen, and optionally oxygen, having a molecular weight less than 1,000, and being of such a nature as to make (i) and (ii) compatible, (iii) photosensitizer, (iv) storage stabilizer, and (v) optionally reinforcing agent, there being in said material from 0.5 to 1.5 total alkenyl radicals per mercapto group.

Polydiorganosiloxane, (i), is substantially linear. In the manufacture of such polymers some branching can occur, however, the amounts are usually very small and do not detract from the basic linear nature of the polymer chain. The silicon-bonded organic radicals can be vinyl, methyl, phenyl, 3,3,3-trifluoropropyl, ethyl, beta-(cyclohexenyl)ethyl, cyclohexenyl, allyl, higher alkenyl radicals, and silacyclopentenyl. (i) should have at least two alkenyl radicals per molecule selected from vinyl, allyl, beta(cyclohexenyl)ethyl, cyclohexenyl, higher alkenyl, and silacyclopentenyl. Because of availability and economical considerations, the silicon-bonded organic radicals are preferably combinations of vinyl, methyl, and phenyl. The degree of polymerization for (i) is from 30 to 1,000, preferably 50 to 500, repeating siloxane units per average molecule.

Polydiorganosiloxanes of (i) which contain higher alkenyl radicals have at least two such siloxane units per molecule. (i) can be a copolymer made up of different siloxane units which may have in each siloxane unit, by way of illustration, monovalent radicals selected from methyl, phenyl, ethyl, and 3,3,3-trifluoropropyl. Preferably, at least 50 percent of the organic radicals are methyl.

The higher alkenyl radicals are particularly useful when it is important to reduce the odor which can be generated in vinyl/mercapto compositions. While the odor emitted upon UV curing is significantly decreased when at least 50 mole percent of the unsaturated radicals are higher alkenyl radicals, it is even more preferred that essentially all the unsaturated radicals be higher alkenyl radicals to further reduce or eliminate the emission of odor. The higher alkenyl radicals include 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl. Alkenyl radicals selected from the group consisting of 5-hexenyl, 7-octenyl, 9-decenyl, and 5,9-decadienyl are preferred, with the most preferred higher alkenyl being the 5-hexenyl radical.

When higher alkenyl radicals are present in the polydiorganosiloxane of (i), it is preferred that the units be selected from the group consisting of dimethylsiloxane units, trimethylsiloxane units, alkenylmethylsiloxane units, methylphenylsiloxane units, diphenylsiloxane units, and alkenyldimethylsiloxane units. Examples of siloxane units which form the polydiorganosiloxane (i) of this invention include trimethylsiloxane units, dimethylsiloxane units, 5-hexenyldimethylsiloxane units, 5-hexenylmethylsiloxane units, dimethylvinylsiloxane units, methylvinylsiloxane units, dimethyl-7-octenylsiloxane units, methyl-7-octenylsiloxane units, diphenylsiloxane units, methylphenylsiloxane units, 9-decenyldimethylsiloxane units, 9-decenylmethylsiloxane units, 5,9-decadienyldimethylsiloxane units, 6-heptenylmethylsiloxane units, and dimethyl-8-nonenylsiloxane units.

The higher alkenyl radical containing polydiorganosiloxane of (i) that are used in the vinyl/mercapto compositions can be prepared by several methods. For example, known siloxanes bearing reactive groups such as SiH may be reacted with an alpha,omega-diene, such as 1,5-hexadiene. Alternatively, suitable olefinic organosiloxanes may be prepared from alkenyl substituted silanes or siloxanes using well known methods of hydrolysis and equilibration. It is usually preferred to prepare olefinic siloxanes by hydrolyzing a silane such as 5-hexenylmethyldichlorosilane in excess water and then equilibrating the resulting hydrolyzate with cyclopolydimethylsiloxanes and a siloxane oligomer containing alkenyldimethylsiloxane end groups using a base catalyst such as KOH. However, it is believed that the olefinic polydiorganosiloxanes of this invention may also be advantageously prepared in a one-step acid-catalyzed process wherein a silane such as 5-hexenylmethyldichlorosilane is hydrolyzed and simultaneously equilibrated with cyclopolydimethylsiloxanes and 1,3-dialkenyl-1,1,3,3-tetramethyldisiloxane.

The mercapto functional crosslinker, (ii), can be either a mercapto functional polyorganosiloxane, a mercapto organic compound, or mixtures thereof. The mercapto functional crosslinkers are selected such that the polydiorganosiloxane, (i), and mercapto functional crosslinker, (ii), are compatible. The combination of (i) and (ii) are compatible when specific polymers or compounds are combined in the amounts to be used, and the resulting mixture does not separate into phases. A cloudy mixture can indicate separate phases and may separate on standing, such combinations are usually not used, however, a cloudy mixture can be used if the storage, viscosity stability, and cure properties are met. The selection for compatibility can readily be determined for any specific polymer or compound. Each kind of unit in (i) and its amount will influence the compatibility with (ii) in which its kind and amount will influence the compatibility.

The mercapto functional crosslinker (ii) should have at least two mercapto groups per molecule, preferably the number of mercapto groups in (ii) is three or more. The molecules of (ii) which contain two mercapto groups are used with (i) in which there is a large number of alkenyl groups per molecule, such as 10. Preferably, (ii) has three or more mercapto groups per molecule because present experimental work suggests that faster UV cures can be obtained with this type of composition.

The mercapto functional polyorganosiloxanes of (ii) can be illustrated by the following examples of mercapto functional polyorganosiloxanes containing hydroxyl endgroups, such as hydroxyl endblocked polymethyl-(gamma-mercaptoisobutyl)siloxane, and hydroxyl endblocked polymethyl-(gamma-mercaptopropyl)siloxane where these polymers have from 3 to 20 mercapto containing siloxane units. The preferred mercapto functional polyorganosiloxanes of (ii) are those in which the mercapto groups are gamma-mercaptopropyl or mercaptoisobutyl.

The mercapto functional crosslinker, (ii), can also be a mercapto organic compound, especially for compositions which have a refractive index greater than 1.48. These mercapto organic compounds are also known in the art by terms such as "polythiols" and "polymercaptans". These mercapto organic compounds contain at least two mercapto groups (—SH) and consist of atoms selected from sulfur, hydrogen, and carbon, and optionally oxygen. Preferably, these mercapto organic compounds contain from 2 to 6 mercapto groups. Some examples are 2,2'-dimercaptodiethylether, dipentaerythritolhexa(3-mercaptopropionate), glycol dimercaptoacetate, glycol dimercaptopropionate, pentaerythritoltetra(3-mercaptopropionate), pentaerythritol tetrathioglycolate, polyethylene glycol dimercaptoacetate of the formula

HSCH$_2$COOCH$_2$(CH$_2$OCH$_2$)$_{11}$CH$_2$OOCCH$_2$SH, polyethylene glycol di(3-mercaptopropionate) of the formula

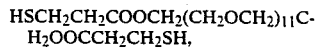
HSCH$_2$CH$_2$COOCH$_2$(CH$_2$OCH$_2$)$_{11}$C-
H$_2$OOCCH$_2$CH$_2$SH, trimethylolethane tri(3-mercaptopropionate), trimethylolethane trithioglycolate, trimethylolpropane tri(3-mercaptopropionate), and trimethylolpropane trithioglycolate.

The photoinitiator or photosensitizer, (iii), is a compound which will initiate a reaction between alkenyl radicals bonded to silicon atoms and mercaptoalkyl groups when irradiated with ultraviolet light. The photosensitizer is compatible in the composition. Compatibility of the photosensitizer can be determined by mixing the ingredients and the photosensitizing compound in an amount of one weight percent based on the weight of the composition and then mixing for up to 16 hours at room temperature, heating at 80° C. for up to four hours, or both. The photosensitizer is said to be compatible if the composition is clear and the photosensitizer has dispersed. Besides compatibility, the photosensitizer should not cause the composition to react undesirably, such as gelling during storage. Some compounds which can be used as photosensitizer in this inventive composition are: benzophenone, trimethylsilylated benzophenone, acetonaphthenone, propiophenone, 3-methylacetophenone, 4-methylacetophenone, benzoin ethyl ether, a dimethylpolysiloxane whose two terminals are bonded to benzoin through an ether linkage, acetophenone, benzoin methylether, benzoin isobutylether, 2,2-diethoxyacetophenone,

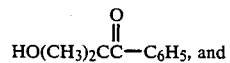
$$HO(CH_3)_2C\overset{O}{\overset{\|}{C}}-C_6H_5, \text{ and}$$

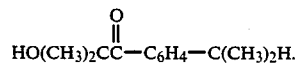
$$HO(CH_3)_2C\overset{O}{\overset{\|}{C}}-C_6H_4-C(CH_3)_2H.$$

The most preferred photosensitizers are 2,2-diethoxyacetophenone and

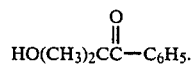
$$HO(CH_3)_2C\overset{O}{\overset{\|}{C}}-C_6H_5.$$

Polysilanes are also useful as photoinitiators in the vinyl/mercapto compositions. The polysilane photoinitiators which are useful are those which are compatible in the compositions. The polysilanes can be the phenylmethylpolysilanes defined by West in U.S. Pat. No. 4,260,780, issued Apr. 7, 1981 which is hereby incorporated by reference; the aminated methylpolysilanes defined by Baney et al. in U.S. Pat. No. 4,314,956, issued Feb. 9, 1982, which is hereby incorporated by reference; the methylpolysilanes of Peterson et al. in U.S. Pat. No. 4,276,424, issued Jun. 30, 1981, which is hereby incorporated by reference; and the polysilastyrene defined by West et al. in U.S. Pat. No. 4,324,901, issued Apr. 13, 1982, which is hereby incorporated by reference.

The viscosity stabilizer, (iv), is a material which is added to the composition to assist in delaying or preventing the gellation of the composition during storage and at temperatures as high as 100° C. This viscosity stabilizer is compatible in the composition and keeps the composition from doubling in 25° C. viscosity when it is heated at 100° C. for 24 hours. Preferably, the composition does not double in 25° C. viscosity when heated at 100° C. for seven days. Amines are observed to serve as viscosity stabilizers. A preferred amine is 2-(diisopropylamino)ethanol. Another amine which is suitable, is trioctylamine. Another type viscosity stabilizer is a free radical scavenger, such as p-methoxyphenol (also known as monomethyl ester of hydroquinone, MEHQ), catechol, 4-t-butylcatechol, phenothiazine, hydroquinone, 2,6-di-t-butyl-p-methylphenol, and N-phenyl-2-naphthylamine. The free radical scavenger viscosity stabilizers are used in amounts of preferably of zero to one weight percent based on the weight of the composition, more preferably from 0.01 to 0.1 weight percent. The most preferred free radical scavenger viscosity stabilizer is MEHQ.

The vinyl/mercapto compositions can contain reinforcing agent, (v). The compositions preferably contain a reinforcing agent when a stronger or tougher cured product is desired or needed. Preferably, a reinforcing agent is present in the composition for optical fiber coating applications. If the composition of this invention is used for other than optical fiber coating, such as for coating electrical equipment and devices, it can contain many kinds of fillers as reinforcing agents such as fumed silica which can be untreated or treated to make it hydrophobic such as with organosilanes, organosiloxanes, or organosilazanes. For optical fiber coating applications, the reinforcing agent should be a material which does not substantially increase the opacity of the composition compared to the composition without the reinforcing agent. For optical fiber coating materials, the reinforcing agent is preferably present in an amount of at least five weight percent. The reinforcing agent for optical fiber coating should also be non-abrasive to a glass surface, especially a glass surface of fiber to be used as an optical fiber. The optical glass fiber can contain certain claddings on its surface. The reinforcing agent is preferably a benzene soluble silicone resin when the composition is used as a coating for optical fibers. One preferred benzene soluble silicone resin contains trimethylsiloxy units, dimethylvinylsiloxy units, and $SiO_2$ units. Other examples of siloxane resins which can be used for reinforcing the composition when used as a coating for optical communications fibers are a resin having 5 mol percent dimethylvinylsiloxy units, 35 mol percent trimethylsiloxy units, and 60 mol percent $SiO_2$ units; a resin having 10 mol percent dimethylvinylsiloxy units, 20 mol percent trimethylsiloxy units, and 70 mol percent monophenylsilsesquioxane units; and resins having 6.3 to 15 mol percent dimethylvinylsiloxy units, 6.8 to 23.7 mol percent trimethylsiloxy units, 0 to 45 mol percent monomethylsilsesquioxane units, and 35 to 85 mol percent monophenylsilsesquioxane units; resins which are copolymers of monopropylsilsesquioxane units and monophenylsilsesquioxane units endblocked with dimethylvinylsiloxy units; and a resin of trimethylsiloxy units and $SiO_2$ units endblocked with diphenylvinylsiloxy units. For a high refractive index composition based on polydiorganosiloxane having phenyl radical, the preferred siloxane resins are phenyl-containing siloxane resins because these provide compatible compositions.

In addition to resins, the vinyl/mercapto compositions can be reinforced by using mixtures of polydiorganosiloxanes for (i) in which at least one polydiorganosiloxane has a low alkenyl radical content, such as is an alkenyl endblocked polydiorganosiloxane and at least one polydiorganosiloxane has a high alkenyl content such as 15 to 30 mol percent siloxane units containing alkenyl radicals. The amount of the high alkenyl content polydiorganosiloxane can be up to 25 percent of the weight of (i). The highest tensile strengths are obtained in the range of from 5 to 20 percent of high alkenyl content polydiorganosiloxane. For example, a mixture of polydiorganosiloxanes can be a dimethylvinylsiloxy endblocked polydimethylsiloxane having a degree of polymerization of 50 to 300 mixed with a dimethylvinylsiloxy endblocked polydiorganosiloxane having 78 mol percent dimethylsiloxane units and 22 mol percent methylvinylsiloxane units and having a degree of polymerization of from 50 to 300 wherein the 22 mol percent methylvinylsiloxane containing polymer is present in amounts of from 5 to 20 weight percent.

Methods of making the vinyl/mercapto compositions involve mixing the ingredients (i) through (v) and can be varied as long as the resulting composition cures when exposed to the UV energy as defined. The mixing method should also not alter the one package stability and the viscosity stability. Preferably, (i) and (iv) are mixed, and then (ii) and (iii) are added and mixed using conventional mixing equipment. When (v) is present, the preferred mixing procedure is to mix (i) and (v) and thereafter add the remaining ingredients. When (v) is the benzene soluble silicone resin as defined above, the mixture of (i) and (v) may require heating or heating at reduced pressure to remove solvent in which the benzene soluble silicone resin is kept. A mixture of (i) and the benzene soluble silicone resin in xylene can be heated to about 100° C. at about 667 Pa to remove the xylene and form a homogeneous mixture of (i) and the resin. Sometimes a mixture of (i), (ii), and (iii) and optionally (v), prepared at room temperature, are slightly cloudy, but become clear indicating compatibility when (iv) is added. Sometimes, if a mixture of (i), (ii), and (iii) and optionally (v), prepared at room temperature, do not become clear upon the addition of (iv), heating the composition may produce clarity (compatibility) which will remain after the composition has cooled to room temperature.

Although compatibility and clarity are preferred, such features should not limit the use of the vinyl/mercapto compositions in optical fiber coating applications, such as primary coatings and secondary coatings because some types of optical fiber coatings do not need to be clear to function properly. An important limitation of these compositions is the ability to cure rapidly as indicated by the UV radiation energy requirement. The UV cure at 70 millijoules or less per square centimeter coating surface should cure the composition in one second or less, preferably in less than 0.3 seconds. If the composition is slightly cloudy and cures in these times with the stated UV radiation, it can be used. The composition can be prepared in most equipment but some metals may cause premature reaction or cures, such as certain ferrous metals. Most storage containers can also be used, but some consideration should be given their ability to maintain stable composition. Also, light should be avoided both during processing and especially during storage.

The vinyl/mercapto compositions are mixtures of ingredients (i) through (v) where there are a total of at least five vinyl functional groups per molecule in (i) plus mercapto groups in (ii) and which have a ratio of alkenyl radicals per mercapto group of 0.5 to 1.5, thus the amounts of (i) and (ii) are defined once the specific polymers are stated. The amounts of (i) and (ii) can vary if (v) is a vinyl containing benzene soluble silicone resin. Also, the compositions preferably have a viscosity at 25° C. in the range of 1 to 20 Pa.s, most preferred is 1 to 8 Pa.s.

Other ingredients which might be considered as useful in the vinyl/mercapto composition are those which do not deleteriously alter the one package stability, the viscosity stability, and the curing conditions. Such ingredients may be dyes, pigments, or other fillers. Some ingredients, such as certain fillers would not find utility as a prime coat for optical fibers because such fillers would be abrasive, however, other less sensitive applications may find such materials completely adequate. Another ingredient which might be added is a processing aid which helps improve the compatibility, viscosity or coating properties but otherwise does not substantially change the composition properties.

The vinyl/mercapto compositions have numerous advantages over many other compositions used for coating optical fiber, such as are one package storable, and have a viscosity which does not double when heated at 100° C. for 24 hours. One advantage is the optical fiber can be made with low attenuation using this composition. These compositions cure at room temperature by exposure to UV radiation. The UV cure is so rapid that very high speed coating lines can be used, such as 300 feet per minute. Cure times of 0.1 second are obtainable. These compositions are not severely inhibited by oxygen during curing. The use of the adhesion promoter (II) for those composition which are to be used as coating for optical fiber has the advantage that the adhesion can be controlled by altering the amounts of (A) and (B) in the combination and also the amount of (II) present in the ultraviolet radiation curable composition.

The vinyl/mercapto compositions cure to elastomers which have a relatively low modulus, are tough, remain elastomeric over a broad temperature range, such as from 80° C. to minus 60° C. for the low refractive index compositions. The compositions cure by an addition type reaction and do not give off by products.

Other utility of the vinyl/mercapto compositions are wood finishing, textile coating, paper and plastic varnishes, adhesives, printing inks, metal decorating coatings, wire coatings, electronic encapsulants, and resist coatings. In each of these applications the amount of adhesion is important.

Another example of a curable material as mixture (I) is a vinyl/SiH composition which is a mixture of (c) a vinyl functional polydiorganosiloxane in which there is at least two vinyl functional groups per molecule, (d) a silicon bonded hydrogen compound having at least two silicon-bonded hydrogen atoms per molecule, and there is a total of at least five vinyl functional groups and silicon-bonded hydrogen atoms per combination of (c) and (d). Such a composition is described by Gant in U.S. Pat. No. 4,064,027, issued Dec. 20, 1977, which is hereby incorporated by reference to show such compositions and their preparation.

The vinyl functional polydiorganosiloxane (c) can contain 0.5 to 100 mole percent of $GG'_kSiO_{(3-k)/2}$ units in which G is a monovalent aliphatic saturated hydrocarbon radical, a monovalent halogenated saturated aliphatic hydrocarbon radical, or a monovalent aromatic hydrocarbon radical, G' is a monovalent aliphatic unsaturated hydrocarbon radical and k has a value of from 0 to 2, and any non vinyl containing units are those having the general formula $G_eSiO_{(4-e)/2}$ in which e has a value of from 0 to 3 and in which the average number of organic groups per silicon atom ranges from 1.99 to 2.01 inclusive. The vinyl functional polydiorganosiloxane (c) can range from low molecular weight fluids, such as polymethylvinylcyclosiloxanes, for example the tetramer, to high molecular weight gums having a molecular weight of one million or more. G can be a monovalent saturated aliphatic hydrocarbon radical including alkyl, such as methyl, ethyl, propyl, butyl, amyl, hexyl, decyl, dodecyl, and octadecyl radicals; a monovalent halogenated aliphatic saturated hydrocarbon radical such as chloromethyl, chloropropyl, bromopropyl, and 3,3,3-trifluoropropyl; or an monovalent aromatic hydrocarbon radical such as phenyl, totyl, benzyl, or 2-phenylethyl. G' can be a monovalent aliphatic unsaturated hydrocarbon radical, such as vinyl, allyl, hexenyl, and octadecenyl radicals. Although the polydiorganosiloxanes of (c) can have zero, one, two, or three monovalent organic radicals per molecule, most of the units have two organic units per molecule and the average number or organic radicals per molecule is from 1.99 to 2.01 inclusive.

Polydiorganosiloxane (c) can be illustrated by the following polymers; dimethylvinylsiloxy-terminated polydimethylsiloxane, dimethylallylsiloxy-terminated polydimethylsiloxane, phenylmethylvinylsiloxy-terminated diphenylsiloxane-dimethylsiloxane copolymer, trimethylsiloxy-terminated methylvinylsiloxane-dimethylsiloxane copolymer, and dimethylvinylsiloxy-terminated dimethylsiloxane-methylvinylsiloxane copolymer.

The silicon-bonded hydrogen compound (d) has at least two silicon-bonded hydrogen atoms per molecule. These compounds can be cyclic, linear, or branched in configuration and can be either homopolymers or copolymers. These compounds range from liquids to solids. The compound of (d) is present in an amount such that the number of G' in (c) plus the number of silicon-bonded hydrogen atoms in (d) is at least five.

Compound (d) contains per molecule at least two hydrogensiloxane units of the general formula $HG_fSiO_{(3-f)/2}$ 

in which each G is the same as defined above, and f is 0, 1, or 2; and any other units in compound (d) are selected from the group consisting of $GSiO_{3/2}$, 

$G_2SiO$, 

$G_3SiO_{\frac{1}{2}}$, 

and $SiO_2$ 

in which each G is as defined above. The molecular configuration of compound (d) can be straight-chained (linear), branched, cyclic, or network. The degree of polymerization is two or more, however, from a standpoint of polymerizability, 2,000 is the upper limit. Some illustrations of compound (d) include dimethylhydrogensiloxy-terminated dimethylsiloxane-methylhydrogensiloxane copolymer, trimethylsiloxy-terminated dimethylsiloxane-methylhydrogensiloxane copolymer, trimethylsiloxy-terminated poly(methylhydrogensiloxane), and cyclic poly(methylhydrogensiloxane).

The amount of polydiorganosiloxane (c) and compound (d) in the composition generally is based on the ratio of silicon-bonded hydrogen atoms in (d) per aliphatic unsaturated hydrocarbon radical in (c). The amounts used are preferably such that there is from 0.2 to 5 moles of silicon-bonded hydrogen atom per mole of aliphatic unsaturated hydrocarbon radical.

The photoinitiator can be any of those described above with the proviso that they are effective with the particular ingredients selected for (c) and (d), as well as, whether and what kind of other ingredients might be present in the composition. Photoinitiators which can be used include aromatic ketones such as acetophenone, trimethylsilylated benzophenone, propiophenone, 3-methylacetophenone, 4-methylacetophenone, benzoin ethyl ether, polydimethylsiloxane in which both ends are bonded through ether linkages with benzoin, 4-allylacetophenone, 3-benzylacetophenone, 4-methoxybenzophenone, 4-isopropyl)phenyl-1-hydroxyisopropyl ketone, benzophenone, benzoin, and 3-pentylacetophenone. Additives which might be used include fillers such as fumed silica, quartz powder, glass fiber, alumina, and metal carbonates such as calcium carbonate and magnesium carbonate.

The ultraviolet-generating source is any such source known in the prior art, such as hydrogen discharge tubes, xenon discharge tubes, low-pressure mercury lamps, medium-pressure mercury lamps, and high-pressure mercury lamps.

Another kind of curable material useful as mixture (I) is an acryl siloxane composition which is a polydiorganosiloxane, (e), having at least two functional groups selected from the group consisting of acrylate, methacrylate, and acrylamide. These polydiorganosiloxanes of (e) can be present in compositions which contain other ingredients, for example the compositions described in copending application Serial No. 118,146, filed Nov. 6, 1987, by Beth I. Gutek, assigned to the same assignee as the present application, and which is hereby incorporated by reference to show such compositions and their preparation. These compositions described by Gutek have a dual curing mechanisms, i.e. they cure by exposure to ultraviolet radiation and also by exposure to moisture.

The acryl siloxane compositions described by Gutek comprise an acrylamide siloxane composition having (1) at least 10 weight percent of an acrylamide polyorganosiloxane having at least two groups which have acrylamide group functionality bonded to silicon atoms through Si-C bonds and on the average at least 20 but less than 1500 siloxane units per molecule, t organic groups bonded to the silicon atoms other than those having the acrylamide group functionality are selected from the group consisting of methyl and phenyl, (2) at least 20 weight percent of a polydiorganosiloxane having endgroups where there are two alkoxy groups per endgroup bonded to silicone through an Si-O bond and one methacrylate group bonded to silicon atoms through Si-C bonds and having on the average less than 350 diorganosiloxane units per molecule, said diorganosiloxane units being selected from dimethylsiloxane units, diphenylsiloxane units, and methylphenylsiloxane units wherein at least 50 percent of the organic groups of the diorganosiloxane are methyl, (3) from 0.5 to 10 weight percent of a photoinitiator which is compatible with (1) and (2), and (4) a catalytic quantity of an organic titanate sufficient to cause a curing reaction when exposed to moisture after the composition is exposed to ultraviolet radiation.

The acrylamide polyorganosiloxane (1) contains at least 20 siloxane units and, as many as, 1500 siloxane units. These siloxane units contain at least two acrylamide functional groups which are bonded to silicon atoms through Si-C bonds. The acrylamide functional groups can be either on the terminal silicon atoms of the polymer chain or they can be pendent on silicon atoms along the polymer chain. The remaining organic groups bonded to the silicon atoms of the polyorganosiloxane are methyl or phenyl, where the methyl are preferred for economical reasons, the combinations of methyl and phenyl can be useful for providing compatible compositions with reactive diluents and photoinitiators. The acrylamide functional polydiorganosiloxanes are known in the art from Varaprath in U.S. Pat. No. 4,608,270, issued Aug. 26, 1986, and is hereby incorporated by reference to show the polyorganosiloxanes with acrylamide functionality and to show the methods of making such polymers. The polyorganosiloxanes preferably contain from 20 to 1500 siloxane units and at least two acrylamide groups. The siloxane units can include dimethylsiloxane units, diphenylsiloxane units, methylphenylsiloxane units, trimethylsiloxy units, dimethylphenylsiloxy units, and siloxane units of the formula

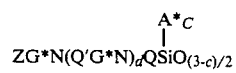

in which Z is H or G'', G'' is a monovalent hydrocarbon radical, A* is methyl or phenyl, Q and Q' are divalent hydrocarbon radicals, G* is an acyl radical having the formula

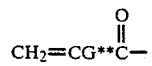

where G is H or $CH_3$, c is 1 or 2, and d is 0 or 1. The monovalent hydrocarbon radicals, G'', can be alkyl radicals such as methyl, ethyl, propyl, butyl, hexyl, and octyl; cycloaliphatic radicals such as cyclohexyl; aryl radicals such as phenyl, benzyl, styryl, tolyl, and xenyl; and alkenyl radicals such as vinyl and allyl. Q and Q' are divalent hydrocarbon radicals such as ethylene, propylene, isopropylene, butylene, isobutylene, hexylene, octylene, and phenylene. Q is preferably ethylene and Q' is preferably propylene or isobutylene. When G is hydrogen, the acyl radical is acrylyl radical and when G** is methyl, the acyl radical is methacrylyl radical. Polydimethylsiloxanes endblocked with

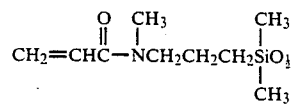

are preferred when the molecular weight is on the low end of the range, such as from 50 to 250 siloxane units, and when low viscosities are desired. The polydimethylsiloxanes which contain pendent or both pendent and terminal acrylamide functional groups are preferred when a higher crosslinked density is desired, such as to make tougher materials. The preferred polydiorganosiloxanes in the present compositions provide compositions which cure by the dual mechanism to coatings which exhibit a tougher material than when the lower molecular weight polydiorganosiloxanes are used.

The polydiorganosiloxane (2) contains dimethylsiloxane units, diphenylsiloxane units, and methylphenylsiloxane units to provide on the average less than 350 siloxane units, preferably less than 100 siloxane units. The polydiorganosiloxane (2) is preferably endblocked with (gamma-methyacryloxyalkyl)dimethoxysiloxy units where the alkyl is preferably propylene or isobutylene. These polydiorganosiloxanes of (2) can be prepared, for example, by mixing hydroxyl endblocked polydiorganosiloxane, a silane such as gamma-methyacryloxypropyltrimethoxysilane or gamma-methyacryloxyisobutyltrimethoxysilane, in the presence of a catalytic amount of alcholic potassium hydroxide. It is recommended that polymerization inhibitor be used during this process and can include such compounds as isophenothiazine and para-methoxyphenol. A slight excess of the theoretical amount of silane is recommended to ensure complete reaction, such as 10 weight percent excess. The ingredients are mixed and heated to remove the stoichiometric amount of methanol (in this illustrated method). After the stoichiometric amount of alcohol is removed, the resulting mixture is neutralized with acetic acid. The polydiorganosiloxanes of (2) have a general formula

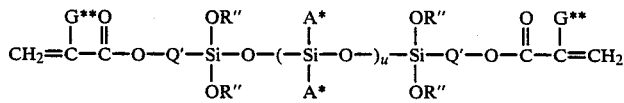

where G** is H or methyl, Q' is a divalent alkylene radical such as propylene or isobutylene, R" is an alkyl radical such as methyl, ethyl or propyl, each A* is methyl or phenyl, and u is an average value of less than 350. The resulting polydiorganosiloxane (2) made from the process defined herein may contain some unreacted silane because an excess is used. Because such an excess is usually in the range of less than 20 weight percent, the compositions can include the excess silane, such as from 5 to 15 weight percent based on the weight of the product of the process.

The photoinitiator (3) is one which is compatible with a combination of (1) and (2) and which will function in the presence of organic titanate. Photoinitiators which are useful in these compositions include $C_6H_5—C(O)C(CH_3)_2—OH$,

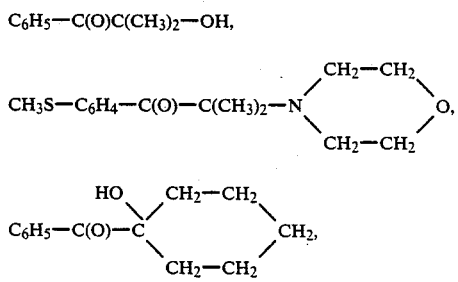

and benzoin methyl ether.

The organic titanate catalyst of (4) provides the moisture curability for the composition and can be any of the conventional organic titanates such as tetraisopropyl titanate, tetrabutyl titanate, bis(acetylacetonate)diisopropyl titanate, and bis(ethoxyacetylacetonate)diisopropyl titanate. The amount of the organic titanate should be sufficient enough to catalyze the composition when exposed to atmospheric moisture after having been exposed to ultraviolet radiation. Thus, any organic titanate which undergoes some reaction from ultraviolet radiation may not be suitable if it looses its ability to cause the curing reaction in the shadowed areas. Also the amount of organic titanate should not be so great as to influence the ultraviolet radiation curing mechanism. A preferred range of organic titanate is from 0.05 to 1 weight percent based on the total weight of the composition. A preferred organic titanate is tetrabutyl titanate.

The acrylamide siloxane compositions can contain a reactive diluent to reduce the viscosity of the composition and to provide tougher cure films and coatings. The reactive diluent must be compatible with the rest of the ingredients of the composition and react during the curing processes so that they become part of the cured product. Reactive diluents which were found to be especially useful for these compositions include isobornyl acrylate, cyclohexyl acrylate, and 2-ethylhexyl acrylate. The compositions can also contain small amounts of multifunctional acrylates, such as up to 10 weight percent based on the weight of the composition. In compositions which are used for purposes other than conformal coatings, the kinds and amounts of reactive diluents will vary, such as the use of diacrylates and multifunctional acrylates.

These acrylamide siloxane compositions have two photocurable polymers, i.e., the acrylamide functional polyorganosiloxane and the methacryloxy functional polydiorganosiloxane. This two polymer combination cures faster when exposed to ultraviolet radiation than compositions containing only the methacryloxy functional polydiorganosiloxanes. The methacryloxy functional polydiorganosiloxane is required because it provides the groups which have the ability to moisture cure. The compositions of the present invention also cure to clear materials. This characteristic is observed when materials, which would otherwise be incompatible when reacted, coreact. If the two functional polymers did not coreact, the cured products would result in hazy or opaque materials, if they cured at all.

These acrylamide siloxane compositions are solventless, can be made with low viscosities, and can be cured to flexible materials which can exhibit cold temperature flexibility. Being solventless and low in viscosity is a desirable combination for coatings such as would be useful as conformal coatings for printed circuit boards, especially when they have dual cure, UV and moisture, and when the resulting cured films and coatings have low temperature flexibility. These acrylamide siloxane compositions are particularly useful as conformal coatings for printed circuit boards or printed wire boards, depending on the terminology one desires to use. Compositions which are especially useful coatings for these boards, have viscosities low enough so that the boards can be dip coated or spray coated, and cure to an acceptable tough coating. Such compositions have a viscosity at 25° C. in the range of 0.07 to 0.2 Pa.s and comprise at least 20 weight percent of (1), polydimethylsiloxane having acrylamide functional groups at the polymer ends; at least 20 weight percent of (2) polydiorganosiloxane having endgroups containing both alkoxy groups and methacrylate groups where there are two alkoxy groups per endgroup bonded to silicon through an Si—O bond and one methacrylate group bonded to silicon through an Si-C bond and having less than 350 diorganosiloxane units per molecule, where said diorganosiloxane units are selected from the group consisting of dimethylsiloxane units, diphenylsiloxane units, and methylphenylsiloxane units wherein at least 50 percent of the organic groups of the diorganosiloxane units are methyl; at least 20 weight percent of a reactive diluent selected from the group consisting of isobornyl acrylate, cyclohexyl acrylate, and 2-ethylhexyl acrylate, 0.5 to 10 weight percent of a photoinitiator which is compatible with (1) and (2), and 0.05 to 1 weight percent of an organic titanate. The preferred compositions cure by exposure to a dose of ultraviolet radiation in the amount of as little as 200 millijoules per square centimeter (in an inert atmosphere such as nitrogen) and still moisture cure in the shadow areas or dark areas, i.e. where the composition is not exposed to the ultraviolet radiation. The compositions require high doses of ultraviolet radiation to cure in air, but readily cure under an inert atmosphere such as nitrogen. Other preferred compositions are those having polydimethylsiloxane (1) having on the average from 20 to 125 dimethylsiloxane units per molecule, polydiorganosiloxane of (2) being polydimethylsiloxane having on the average from 10 to 50 dimethylsiloxane units per molecule, and the reactive diluent is isobornyl acrylate.

A specific acrylamide siloxane composition which is useful as mixture (I) is designed to cure by exposure to ultraviolet radiation in an air atmosphere and be useful as a conformal coating, is disclosed in a copending application Ser. No. 118,086, filed Nov. 6, 1987, by Beth I. Gutek, and assigned to the same assignee as the present application, now U.S. Pat. No. 4,824,875, issued Apr. 25, 1989, and is hereby incorporated by reference to show such conformal coating compositions which can be used as mixture (I) of this invention. These acrylamide siloxane compositions will be referred to herein as conformal coating compositions.

The conformal coating compositions have dual cure properties, i.e., ultraviolet radiation cure and moisture cure. These compositions are designed to be used as conformal coatings and have uncured properties, curing characteristics, and cured properties which makes them particularly useful to coat printed circuit boards or printed wire boards.

The conformal coating compositions, as a specific embodiment, comprise (1a) at least 20 weight percent based on the total weight of the composition of an acrylamide polydimethylsiloxane having acrylamide end groups bonded to silicon atoms through Si—C bonds and on the average at least 20 to less than 300 dimethylsiloxane units per molecule, (2a) at least 20 weight percent based on the total weight of the composition of a polydiorganosiloxane having endgroups containing both alkoxy groups and methacrylate groups where there are two alkoxy groups per endgroup bonded to silicon through an Si—O bond and one methacrylate group bonded to silicon through an Si—C bond and having on the average less than 350 diorganosiloxane units per molecule, said diorganosiloxane units being selected from dimethylsiloxane units, diphenylsiloxane units, and methylphenylsiloxane units wherein at least 50 percent of the organic groups of the diorganosiloxane units are methyl, (3a) at least 20 weight percent based on the total weight of the composition of a reactive diluent selected from the group consisting of isobornyl acrylate, cyclohexyl acrylate, and 2-ethylhexyl acrylate, (4a) from 0.5 to 10 weight percent based on the total weight of the composition of a photoinitiator combination in which there is at least 0.25 weight percent of

and at least 0.25 weight percent of

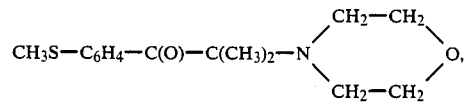

(5a) from 0.1 to 2 weight percent based on the total weight of the composition of an amine selected from the group consisting of dimethylethanolamine and diisopropylethylamine, and (6a) from 0.05 to 1 weight percent based on the total weight of the composition of an organic titanate, where the composition has a viscosity at 25° C. in the range of 0.07 to 0.2 Pa.s.

The conformal coating compositions cure extremely fast and because they cure so fast in a nitrogen gas atmosphere, it is necessary to cure them in the presence of air (oxygen) to slow the rate of cure down. These compositions have a low viscosity, have the ability to cure by both UV radiation and moisture to films which have low temperature flexibility.

The acrylamide polydimethylsiloxane (1a) contains at least 20 siloxane units and less than 300 siloxane units. The polydimethylsiloxanes which are useful in the conformal coating composition are those which have from 20 to less than 300 dimethylsiloxane units and two terminal siloxane units with acrylamide groups. The acrylamide functional polydimethylsiloxanes are known from Varaprath as further described above. Polydimethylsiloxanes endblocked with

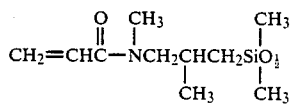

are preferred when there are from 20 to 125 siloxane units per molecule. The most preferred acrylamide polydimethylsiloxanes of (1a) are those which have from 70 to 110 siloxane units per molecule. The amount of (1a) in the conformal coating compositions is at least 20 weight percent based on the total weight of the composition. The preferred amount of (1a) is from 25 to 40 weight percent based on the total weight of the composition.

The polydiorganosiloxane (2a) are described above for the acrylamide siloxane composition (2). The polydiorganosiloxane (2a) is preferably endblocked with (gamma-methyacryloxyalkyl)dimethoxy-siloxy units where the alkyl is preferably propylene or isobutylene and preferably contain on the average from 10 to 60 siloxane units per molecule. The most preferred compositions contain polydiorganosiloxane (2a) in which there are from 40 to 60 siloxane units per molecule. The polydiorganosiloxanes can be single polymers which provide the required average number of siloxane units per molecule or they can be mixtures of polymers which provide the required average number of siloxane units per molecule. The polydimethylsiloxane (2a) is present in an amount of at least 20 weight percent based on the total weight of the composition. The preferred conformal coating compositions contain from 20 to 30 weight percent polydiorganosiloxane (2a) based on the total weight of the composition.

The reactive diluent (3a) is used to reduce the viscosity of the conformal coating composition and to provide tougher cure films and coatings. The reactive diluent must be compatible with the rest of the ingredients of the composition and react during the curing processes so that they become part of the cured product. Reactive diluents include isobornyl acrylate, cyclohexyl acrylate, and 2-ethylhexyl acrylate. The conformal coating compositions can also contain small amounts of multifunctional acrylates, such as up to 10 weight percent based on the weight of the composition. Reactive diluent (3a) is preferably isobornyl acrylate. Reactive diluent (3a) is present in the conformal coating composition in an amount of at least 20 weight percent based on the total weight of the composition. The preferred conformal coating compositions contain an amount of isobornyl acrylate of from 25 to 45 weight percent based on the total weight of the composition.

The photoinitiator (4a) is present in an amount of from 0.5 to 10 weight percent of a combination based on the total weight of the composition in which there is at least 0.25 weight percent of

and at least 0.25 weight percent of

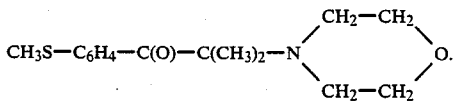

Photoinitiator combination (4a) is preferably present in an amount of from 1 to 5 weight percent in which 2-hydroxy-2-methylphenylpropanone provides an amount of from 1.5 to 3 weight percent and 2-methyl-1-[4-(methylthio)phenyl]-2-morpholenopropanone provides an amount of from 1.5 to 3 weight percent. A combination of photoinitiators together with an amine and organic titanate would provide a fast UV curing composition which also had moisture curing characteristics. Although some other photoinitiator combinations improved the rate of UV cure, the overall properties of the conformal coating compositions are superior as a conformal coating for printed wire boards.

Amine (5a) is dimethylethanolamine or diisopropylethylamine and is present in an amount of from 0.1 to 2 weight percent, preferably from 0.5 to 1.5 weight percent, wherein the weight percentages are based on the total weight of the composition. These amines reduce the surface tackiness of the conformal coating compositions. The preferred amine is dimethylethanolamine.

The organic titanate catalyst of (6a) provides the moisture curability for the composition and can be any of the conventional organic titanates as described above for (4). The amount of the organic titanate should be sufficient enough to catalyze the composition when exposed to atmospheric moisture after having been exposed to ultraviolet radiation. This amount of organic titanate is from 0.05 to 1 weight percent based on the total weight of the composition. Thus, any organic titanate which undergoes some reaction from ultraviolet radiation may not be suitable if it looses its ability to cause the curing reaction in the shadowed areas. Also the amount of organic titanate should not be so great as to influence the ultraviolet radiation curing mechanism. A preferred range of organic titanate is from 0.05 to 1 weight percent based on the total weight of the composition. A preferred organic titanate is tetrabutyl titanate.

The conformal coating compositions can also contain a photosensitizer which can influence the ultraviolet radiation curing by improving the rate of cure and uniformity of the cure. These photosensitizers include dyes, for example, 4-methyl-7-(N,N-diethylamino)-coumarin. These photosensitizers are preferably present in small amounts such as less than 0.5 weight percent based on the total weight of the composition.

Other adhesion additive can also be used in combination with the adhesion promoter (II) in the conformal coating compositions. One adhesion additive which has been found to be useful is a mixture of hexamethoxysilethylene and pentaerythritol, which is particularly useful in the weight ratio of 40 to 60 weight percent of the hexamethoxysilethylene and 40 to 60 weight percent of the pentaerthritol based on the weight of the adhesion additive. The hexamethoxysilethylene has a formula.

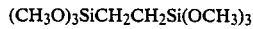

These adhesion additives ensure the adhesion of the conformal coating to the printed circuit boards.

The conformal coating compositions can also contain certain other additives which are not detrimental to the curing characteristics, the storage stability, the cured film, and the usefulness of the cured film. Such additives include antioxidants and storage stabilizers.

Substrates which are populated with devices having geometries such that coating them produces areas where the composition would be in the shadows when the ultraviolet radiation is directed at the surface, can be coated with the conformal coating compositions which can be cured in areas where the ultraviolet radiation strikes, as well as, in the shadow area. The composition in the shadow areas will cure by merely being exposed to atmospheric moisture. Such substrates include populated printed circuit boards or printed wire boards.

The conformal coating compositions have two photocurable polymers, i.e., the acrylamide functional polyorganosiloxane and the methacryloxy functional polydiorganosiloxane. This two polymer combination cures faster when exposed to ultraviolet radiation than compositions containing only the methacryloxy functional polydiorganosiloxanes. The methacryloxy functional polydiorganosiloxane is required because it provides the groups which have the ability to moisture cure. The compositions cure to clear materials.

These compositions have a combination of properties including being solventless, being low in viscosity (0.07 to 0.2 Pa.s, when measured at 25° C.) and curing to flexible materials exhibiting cold temperature flexibility. Being solventless and low in viscosity is a requirement for conformal coatings for printed circuit boards, especially when they have dual cure, UV and moisture, and when the resulting cured films and coatings have low temperature flexibility. The low viscosity is required so that the composition can be coated by dip coating or spray coating.

The conformal coating compositions are useful as conformal coatings for printed circuit boards or printed wire boards. The preferred conformal coating compositions cure by exposure to a dose of ultraviolet radiation in the amount of as little as 200 millijoules per square centimeter (in air) and still moisture cure in the shadow areas or dark areas, i.e. where the composition is not exposed to the ultraviolet radiation. The conformal coating compositions are exposed to ultraviolet radiation to cure in air, because they cure so fast under an inert atmosphere, such as nitrogen, that the surface cures before the material below the surface even though it may only be one to three mils in thickness. The fast UV cure under an nitrogen atmosphere might be used in applications where the coatings are very thin, basically a surface cure.

The source of the ultraviolet radiation is not critical as long as cure can be obtained. It is preferred to use a broad spectrum wavelength ultraviolet source for radiating the composition to provide cure. Many sources are available commercially.

The forgoing compositions which can be used as mixture (I) are illustrations of the many types of ultraviolet radiation curable compositions. The addition of adhesion promoter (II) to these compositions provide the best results observed. However, it is not intended that the present invention should be limited to these compositions.

The following examples are intended to be illustrative of the present invention but should not be construed as limiting. The present invention is properly delineated in the claims. In the following examples, "part or parts" represent "part by weight or parts by weight", the viscosity is at 25° C. unless otherwise stated.

EXAMPLE 1

Ultraviolet radiation curable siloxane compositions were prepared by mixing 100 parts of Mixture A with an amount of

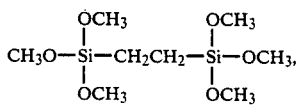

Alkoxysilicon Compound A, and an amount of a catalyst. The amounts used and the catalyst were as described in Table I.

TABLE I

| SAMPLE | AMOUNT OF ALKOXYSILICON COMPOUND A | CATALYST | AMOUNT OF CATALYST |
|---|---|---|---|
| A | NONE | NONE | NONE |
| B | 1.0 | NONE | NONE |
| C | 1.0 | DIBUTYLTIN DIACETATE | 0.5 |
| D | 1.0 | TETRABUTYL TITANATE | 0.5 |
| E | 2.0 | TETRABUTYL TITANATE | 0.5 |
| F | 5.0 | TETRABUTYL TITANATE | 0.5 |

The appearance of samples was as follows: Sample A was clear. Samples B, D, E, and F were opaque. Sample C gelled. Mixture A was prepared by mixing 79.4 parts of a mixture of 32 weight percent xylene and 68 weight percent of benzene soluble silicone resin containing dimethylvinylsiloxy units, trimethylsiloxy units, and SiO$_2$ units where the ratio of the sum of mols of dimethylvinylsiloxy units and trimethylsiloxy units to SiO$_2$ units was 0.65:1 and there was 1.9 weight percent vinyl radical in the resin with 100 parts of dimethylvinylsiloxy endblocked polydimethylsiloxane having a viscosity of about 2 Pa.s. The resulting mixture was stripped of xylene by heating to 100° C. at a pressure of about 670 Pa resulting in a clear polymer-resin blend. A mercapto functional polyorganosiloxane of the average formula

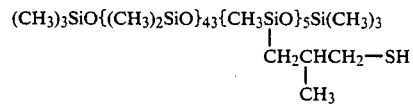

in an amount of 17.81 parts was mixed into 80.23 parts of the polymer-resin blend and then 0.98 part of photosensitizer,

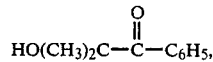

and 0.98 part of 2-(diisopropylamino)ethanol was mixed to make Mixture A which was clear, had a viscosity of 2.08 Pa.s, and was stored in a container opaque to light including UV radiation.

Composition of each sample was cast onto aluminum Q-panels with mill finish, 500-A 35, and also on glass slides, Corning 2948 micro slides. The coating had an 8 mil wet thickness. The coating was cured by irradiating with ultraviolet radiation for 1.2 seconds under two medium pressure mercury vapor arc lamps housed in an Ashdee UV-12 H/2 Cure Reactor to give a dosage of 60 mJ/cm$^2$ (wavelength=365 nanometers). The adhesion of the coating to the substrate was determined by removing it with a spatula. The results observed were as shown in Table II wherein AF=adhesive failure; WE=adhesive failure with noticeable adhesion; WD=spotty cohesive failure; and CF=cohesive failure.

TABLE II

| SUBSTRATE | CURE TIME AMBIENT | ADHESION SAMPLE | | | | | |
|---|---|---|---|---|---|---|---|
| | | A | B | C | D | E | F |
| ALUMINUM | 30 minutes | AF | AF | GELLED | AF | WE | AF |
| | 1 day | AF | AF | | AF | CF | CF |
| | 3 days | AF | AF | | AF | CF | CF |
| | 8 days | AF | AF | | AF | CF | CF |
| | Heat cure** | AF | AF | | CF | CF | CF |
| GLASS | 30 minutes | AF | AF | | AF | CF | AF |
| | 1 day | AF | AF | | AF | CF | WD |
| | 3 days | AF | AF | | AF | CF | CF |
| | 8 days | AF | AF | | AF | CF | CF |
| | Heat cure** | AF | WD | | CF | CF | CF |

**Heat cure = 8 days at ambient and 30 minutes at 150° C.

The results demonstrate the ability of the alkoxysilicon compound in the presence of a titanate catalyst to impart unprimed, room temperature (ambient) adhesion to a ultraviolet radiation curable siloxane composition. Adhesion improves by aging at room temperature and by heating.

EXAMPLE 2

Ultraviolet radiation curable siloxane composition, A, was prepared by mixing 100 parts of Mixture A with 2.0 parts of the alkoxysilicon compound described in Example 1 and 0.5 part of tetrabutyl titanate.

Ultraviolet radiation curable siloxane composition, B, was prepared by mixing 100 parts of a ultraviolet radiation activatable siloxane polymer of the formula

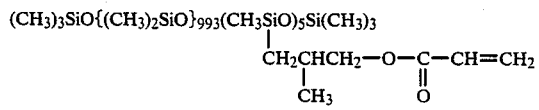

with 2 parts of the photosensitizer as described in Example 1, 2 parts of the alkoxysilicon compound as described in Example 1, and 0.5 part of tetrabutyl titanate.

Films of each of the compositions were cast on to substrates as identified in Table III to provide a wet thickness of about 8 mils. The aluminum and glass substrates were the same as described in Example 1, a steel Q-panel with a thickness of 0.020 inch, smooth finish, 400 QD 35, and a polycarbonate sheet from Alma Plastics, Grand Rapids, Michigan was also used as substrates. Using the same equipment as an ultraviolet radiation source as described in Example 1, composition A was irradiated for 2.2 seconds to provide a dosage of 112 mJ/cm2 and composition B was irradiated for 4.5 seconds to provide a dosage of 224 mJ/cm2. The adhesion was tested as described in Example 1 and the results observed as shown in Table III.

TABLE III

| SUB-STRATE | CURE TIME AMBIENT | ADHESION COMPOSITION A | ADHESION COMPOSITION B |
|---|---|---|---|
| ALUMINUM | 0 hours | AF | AF |
| | 2 hours | CF | CF |
| | 7 days | CF | CF |
| | Heat cure*** | CF | CF |
| GLASS | 0 hours | AF | AF |
| | 2 hours | CF | CF |
| | 7 days | CF | CF |
| | Heat cure*** | CF | CF |
| STEEL | 0 hours | AF | AF |
| | 2 hours | AF | CF |
| | 7 days | WE | CF |
| | Heat cure*** | CF | CF |
| POLY-CARBONATE | 0 hours | AF | AF |
| | 2 hours | AF | AF |
| | 7 days | AF | AF |

***Heat cure = 7 days at ambient plus 30 minutes at 150° C.

Composition A and Composition B without the alkoxysilicon compound and the titanate catalyst exhibited adhesive failure on all four substrates after 7 days at room temperature (ambient) and after 7 days at room temperature plus 30 minutes at 150° C.

The viscosity of Composition A was observed with and without the adhesion promoter (the alkoxysilicon compound and the titanate). Without the adhesion promoter, initially and after one day and seven days, Composition A had viscosities of 2.12 Pa.s, 2.18 Pa.s, and 2.24 Pa.s respectively. With the adhesion promoter, initially and after one day and seven days, Composition B had viscosities of 2.4 Pa.s, 3.5 Pa.s, and 9.4 Pa.s.

The effectiveness of the adhesion promoter decreased with time, i.e. between the time of preparation and the time of UV exposure. Table IV shows the results of uncured aging. The coating and curing procedures were the same as described above. The adhesion was observed after seven days at room temperature.

TABLE IV

| UNCURED AGING TIME | ALUMINUM | GLASS | STEEL | POLYCARBONATE |
|---|---|---|---|---|
| Initially | CF | CF | WE | AF |
| 1 day | CF | — | — | — |
| 7 days | AF | CF | AF | AF |

The decreasing effectiveness was most likely due to premature hydrolysis and crosslinking of the alkoxysilicon compound. Avoidance of this phenomenon can be achieved by protecting the composition from moisture or by using larger amounts of the alkoxysilicon compound. Another approach to providing storage stability, when needed, is to store the adhesion promoter in a separate package until use is required.

EXAMPLE 3

The effectiveness of different alkoxysilicon compounds were investigated by making ultraviolet radiation curable siloxane compositions by mixing 100 parts of Mixture A, 2 parts of an alkoxysilicon compound as defined in Table V, and 0.5 part of tetrabutyl titanate. The coating and curing procedures were as described in Example 2 for Composition A where the adhesion was observed after 7 days at room temperature. The results observed were as shown in Table V. In Table V, Compound A is the alkoxysilicon compound described in Example 1, Compound B is an alkoxysilicon compound of the following formula

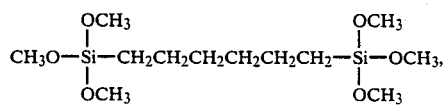

Compound C is allyltrimethoxysilane, Compound D is ethyltrimethoxysilane, and Compound E is ethylpolysilicate. Compounds C, D, and E are included for comparison.

TABLE V

| SUBSTRATE | CURE TIME | COMPOUND A | B | C | D | E |
|---|---|---|---|---|---|---|
| ALUMINUM | 0 day | AF | AF | WE | AF | AF |
| | 1 day | CF | CF | CF | AF | AF |
| | 7 days | CF | CF | CF | AF | CF |
| GLASS | 0 day | AF | AF | WE | AF | AF |
| | 1 day | WE | WE | WE | AF | CF |
| | 7 days | CF | CF | WE | AF | CF |
| STEEL | 0 day | AF | AF | AF | AF | AF |
| | 1 day | CF | CF | AF | AF | AF |
| | 7 days | CF | CF | AF | AF | CF |
| POLYCARBONATE | 0 day | AF | AF | AF | AF | AF |
| | 1 day | AF | AF | AF | AF | WE |
| | 7 days | AF | AF | AF | AF | AF |

EXAMPLE 4

Ultraviolet radiation curable siloxane compositions were prepared as described below, Compositions A4, B4, and C4. The compositions were coated on the described substrate to provide a 10 mil wet thickness, cured by exposure to ultraviolet radiation from a UVEXS, LCU Model 750A ultraviolet curing unit, manufactured by UVEXS, Inc., Mountain View, Ca., providing a dosage of 900 mJ/cm2 and then tested for adhesion as described in Example 1. The results of the adhesion test were as described in Table VI.

Composition A4 was a mixture of 77 parts of the polymer-resin blend as described in Example 1, 21 parts of the mercapto functional polyorganosiloxane as described in Example 1, 1 part of photosensitizer as described in Example 1, and 1 part of 2-(diisopropylamino)ethanol.

Composition B4 was the mixture of Composition A4 plus 2 weight percent of the alkoxysilicon compound described in Example 1. Compositions A4 and B4 are included for comparison.

Composition C4 was Composition B4 plus 0.5 weight percent of tetrabutyl titanate.

TABLE VI

| SUBSTRATE | CURE TIME | ADHESION COMPOSITION | | |
|---|---|---|---|---|
| | | A4 | B4 | C4 |
| Aluminum | 0 minutes | AF | AF | AF |
| | 30 minutes | AF | AF | AF |
| | 150 minutes | AF | AF | AF |
| | 24 hours | AF | AF | AF |
| | 30 min @ 150° C. | AF | CF | CF |
| Glass | 0 minutes | AF | AF | AF |
| | 30 minutes | AF | AF | AF |
| | 150 minutes | AF | AF | AF |
| | 24 hours | AF | AF | CF |
| | 30 min @ 150° C. | AF | CF | CF |
| Epoxy sheet | 0 minutes | AF | AF | AF |
| | 30 minutes | AF | AF | AF |
| | 150 minutes | AF | CF | AF |
| | 24 hours | AF | CF | CF |
| Nylon sheet | 0 minutes | AF | AF | AF |
| | 30 minutes | AF | AF | AF |
| | 150 minutes | AF | AF | AF |
| | 24 hours | AF | AF | AF |
| Phenolic sheet | 0 minutes | AF | AF | AF |
| | 30 minutes | AF | AF | AF |
| | 150 minutes | AF | AF | AF |
| | 24 hours | AF | CF | CF |

For comparison, a mixture of Ebecryl 4883, a urethane acrylate oligomer having a viscosity at 60° C. of 2.8 to 4.2 Pa.s and an average molecular weight of 1,611, 2-ethylhexyl acrylate, and the photosensitizer as described in Example 1 was made. Ebecryl 4883 is 85 weight percent urethane acrylate oligomer and 15 weight percent tripropylene glycol diacrylate, and is available from Radcure Specialties of Virginia. A number of additives were mixed with this composition, coated on aluminum and glass panels, cured by exposure to UV radiation as described above and then tested for adhesion. The following additives were used: none, gamma-methacryloxypropyltrimethoxysilane, gamma-methacryloxypropyltrimethoxysilane plus tetrabutyl titanate, the alkoxysilicon compound of Example 1, the alkoxysilicon compound of Example 1 plus tetrabutyl titanate, the reaction product of the alkoxysilicon compound of Example 1 and the hydroxyl endblocked polydimethylsiloxane having about 4 weight percent hydroxyl and a viscosity of about 0.04 Pa.s, the forgoing reaction product plus tetrabutyl titanate, ethylpolysilicate, and ethylpolysilicate plus tetrabutyl titanate. All of the resulting coatings exhibited adhesive failure to both aluminum and glass.

EXAMPLE 5

The peel strength of compositions were measured with the following results. Each test panel was prepared by impregnating glass cloth with a composition on an aluminum panel, cured with ultraviolet radiation, and then the adhesion test was performed. The compositions were: A6 was the same as A4, B5 was A4 plus 0.5 weight percent tetrabutyl titanate and 2 weight percent of the alkoxysilicon compound as described in Example 1, and C5 was A4 plus 2 weight percent allyltrimethoxysilane and 0.5 weight percent tetrabutyl titanate. The peel strength for each of these compositions were A5=0.015 pounds per inch, B5=0.821 pounds per inch (cohesive failure), and C5=0.031 pounds per inch.

EXAMPLE 6

A variety of ultraviolet curable siloxane compositions were prepared and the adhesion and other physical properties were examined. These compositions could be used as conformal coating compositions.

A copolymer was prepared by mixing and heating the following ingredients: 400 parts of a hydroxyl endblocked polydimethylsiloxane having a viscosity of about 2.6 Pa.s, 10.22 parts of gamma-methacryloxypropyltrimethoxysilane, 50 ppm of methylhydroquinone, 1.66 parts of the mercapto functional polyorganosiloxane as described in Example 1, 10.6 cc of 0.1 normal potassium hydroxide, 0.85 cc in phenothiazine solution, and 0.097 cc of methylhydroquinone. The resulting copolymer had a formula

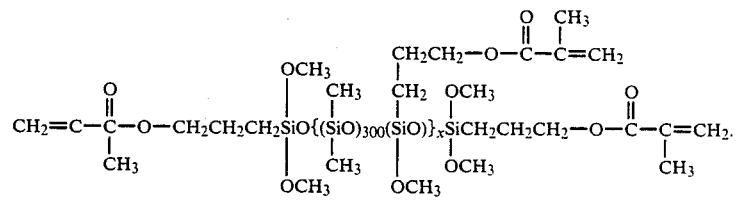

This copolymer had a value for x in the range of 0 to 10 such that the viscosity was 22.7 Pa.s.

This copolymer was used to prepare the following compositions:

Composition A6 was a mixture of 6 parts of the copolymer, 3.9 parts of isobornyl acrylate, 0.1 part of 1,6-hexanediol diacrylate, 0.3 part of the photosensitizer as described in Example 1, 0.2 part of tetrabutyl titanate, and 0.3 part of the alkoxysilicon compound as described in Example 1.

Composition B6 was a mixture of 5 parts of the copolymer, 5 parts of isobornyl acrylate, 0.3 part of the photosensitizer as described in Example 1, 0.2 part of tetrabutyl titanate, and 0.3 part of the alkoxysilicon compound as described in Example 1.

Composition C6 was a mixture of 5 parts of the copolymer, 4.9 parts of isobornyl acrylate, 0.1 part of 1,6-hexanediol diacrylate, 0.3 part of the photosensitizer as described in Example 1, 0.2 part of tetrabutyl titanate, and 0.3 part of the alkoxysilicon compound as described in Example 1.

Composition D6 was a mixture of 5 parts of the copolymer, 4.9 parts of isobornyl acrylate, 0.1 part of 1,6-hexanediol diacrylate, 0.3 parts of the photosensitizer as described in Example 1, 0.2 part of tetrabutyl titanate, and 0.6 part of the alkoxysilicon compound as described in Example 1.

The compositions were coated on substrates to provide an 8 mil wet thickness which was cured by exposure to UV radiation under an air atmosphere with 15 passes at 25 fpm using the Ashdee Cure Reactor described in Example 1. The coated substrates were then tested for adhesion. The cure time was the time lapsed after the composition had been cured. These compositions can have additional cure by exposure to moisture. The results were as shown in Table VII.

TABLE VII

| SUBSTRATE | CURE TIME | COMPOSITION | | | |
|---|---|---|---|---|---|
| | | A6 | B6 | C6 | D6 |
| Aluminum | 0 hour | WE | WE | WE | AF |
| | 4 hours | WE | WE | WE | WE |
| | 24 hours | WE | WD | WD | WD |
| | 48 hours | WE | WD | WD | WD |
| | 192 hours | WE | WD | WD | WD |
| Stainless steel | 0 hour | CF | CF | CF | CF |
| | 4 hours | CF | CF | CF | CF |
| | 24 hours | CF | CF | CF | CF |
| | 48 hours | CF | CF | CF | CF |
| | 192 hours | CF | CF | CF | CF |
| Polycarbonate | 0 hour | AF | AF | AF | AF |
| | 4 hours | AF | AF | AF | AF |
| | 24 hours | AF | AF | WE | WE |
| | 48 hours | AF | WE | WE | WD |
| | 192 hours | CF | CF | CF | CF |
| Glass | 0 hour | CF | WE | CF | CF |
| | 4 hours | CF | WE | CF | CF |
| | 24 hours | CF | CF | CF | CF |
| | 48 hours | CF | CF | CF | CF |
| | 192 hours | CF | CF | WD | CF |

The shadow cure of Composition B6 and C6 were observed by checking the cure below the surface of films which were cured by exposure to UV radiation, 10 passes at 25 fpm. The compositions were cured three days after preparation. The cure time was the time lapsed from the time the wet coating was exposed to UV and the time of the check for shadow cure. The results were as shown in Table VIII.

TABLE VIII

| HOURS CURE TIME | COMPOSITION B6 | COMPOSITION C6 |
|---|---|---|
| 0 | uncured | uncured |
| 2 | uncured | uncured |
| 24 | uncured | uncured |
| 48 | cured part way | cured part way |
| 72 | cured part way | cured part way |
| 192 | completely cured | completely cured |

The physical properties of the cured film was determined and the results observed were as shown in Table XI.

TABLE XI

| PROPERTY | COMPOSITION | | | |
|---|---|---|---|---|
| | A6 | B6 | C6 | D6 |
| Tensile strength, at break, psi | 588 | 880 | 630 | 670 |
| Elongation at break, % | 182 | 186 | 113 | 101 |
| Modulus at 5%, psi | 15 | 13 | 29 | 61 |
| Modulus at 25%, psi | 69 | 75 | 139 | 215 |

That which is claimed is:

1. An ultraviolet radiation curable siloxane composition comprising
   (I) a mixture comprising (a) a vinyl functional polydiorganosiloxane in which there is at least two vinyl functional groups per molecule, there is also present (b) a mercapto functional compound having at least two mercapto groups per molecule, and there is a total of at least five vinyl functional groups plus mercapto groups per combination of (a) and (b), and a photoinitiator which is activated by ultraviolet radiation, and
   (II) an adhesion promoter for ultraviolet radiation curable compositions, a combination consisting of
   (A) an alkoxysilicon compound having a general formula $(RO)_3Si-X-Si(OR)_3$ in which R is methyl or ethyl and X is a divalent radical selected from the group consisting of $-(CH_2)_n-$ where n has a value of from 1 to 10 inclusive and $-O(R'_2SiO)_m-$ where each R' is independently selected from a group consisting of RO—, an aliphatic hydrocarbon radical, and an aromatic hydrocarbon radical, where m has a value of from 0 to 10 inclusive, and
   (B) a compound capable of catalyzing a reaction between two ≡SiOR groups in the presence of atmospheric moisture or between ≡SiOR and a hydroxyl group on a substrate.

2. The ultraviolet radiation curable siloxane composition according to claim 1 in which mixture (I) also contains an amine compound.

3. The ultraviolet radiation curable siloxane composition according to claim 2 in which the amine compound is diisopropylethanol amine.

4. The ultraviolet radiation curable siloxane composition according to claim 1 in which mixture (I) also contains reinforcing agent.

5. The ultraviolet radiation curable siloxane composition according to claim 1 in which (A) is

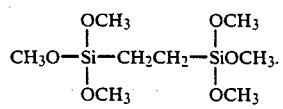

6. The ultraviolet radiation curable siloxane composition according to claim 1 in which (B) is an organotitanate.

7. The ultraviolet radiation curable siloxane composition according to claim 5 in which (B) is an organotitanate.

8. The ultraviolet radiation curable siloxane composition according to claim 6 in which the organotitanate is tetrabutyltitanate.

9. The ultraviolet radiation curable siloxane composition according to claim 1 in which adhesion promoter (II) is present in an amount of from 0.15 to 3.5 weight percent based on the weight of mixture (I).

10. The ultraviolet radiation curable siloxane composition according to claim 2 in which adhesion promoter (II) is present in an amount of from 0.15 to 3.5 weight percent based on the weight of mixture (I).

11. The ultraviolet radiation curable siloxane composition according to claim 3 in which adhesion promoter (II) is present in an amount of from 0.15 to 3.5 weight percent based on the weight of mixture (I).

12. The ultraviolet radiation curable siloxane composition according to claim 4 in which adhesion promoter (II) is present in an amount of from 0.15 to 3.5 weight percent based on the weight of mixture (I).

13. The ultraviolet radiation curable siloxane composition according to claim 5 in which adhesion promoter (II) is present in an amount of from 0.15 to 3.5 weight percent based on the weight of mixture (I).

14. The ultraviolet radiation curable siloxane composition according to claim 6 in which adhesion promoter (II) is present in an amount of from 0.15 to 3.5 weight percent based on the weight of mixture (I).

15. The ultraviolet radiation curable siloxane composition according to claim 7 in which adhesion promoter (II) is present in an amount of from 0.15 to 3.5 weight percent based on the weight of mixture (I).

16. The ultraviolet radiation curable siloxane composition according to claim 8 in which adhesion promoter (II) is present in an amount of from 0.15 to 3.5 weight percent based on the weight of mixture (I).

17. An ultraviolet radiation curable siloxane composition comprising.

(I) a mixture comprising (c) a vinyl functional polydiorganosiloxane in which there is at least two vinyl functional groups per molecule, there is also present (d) a silicon-bonded hydrogen compound having at least two silicon-bonded hydrogen atoms per molecule, and there is a total of at least five vinyl functional groups and silicon-bonded hydrogen atoms per combination of (c) and (d), and a photoinitiator which is activated by ultraviolet radiation, and (II) an adhesion promoter for ultraviolet radiation curable compositions, a combination consisting of (A) an alkoxysilicon compound having a general formula $(RO)_3Si-X-Si(OR)_3$ in which R is methyl or ethyl and X is a divalent radical selected from the group consisting of —$(CH_2)_n$— where n has a value of from 1 to 10 inclusive and —$O(R'_2SiO)_m$— where each R' is independently selected from a group consisting of RO—, an aliphatic hydrocarbon radical, and an aromatic hydrocarbon radical, where m has a value of from 0 to 10 inclusive, and (B) a compound capable of catalyzing a reaction between two ≡SiOR groups in the presence of atmospheric moisture or between ≡SiOR and a hydroxyl group on a substrate.

18. The ultraviolet radiation curable siloxane composition according to claim 17 in which mixture (I) also contains reinforcing agent.

19. The ultraviolet radiation curable siloxane composition according to claim 17 in which (A) is

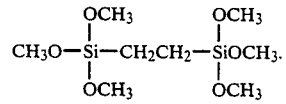

20. The ultraviolet radiation curable siloxane composition according to claim 17 in which (B) is an organotitanate.

21. The ultraviolet radiation curable siloxane composition according to claim 19 in which (B) is an organotitanate.

22. The ultraviolet radiation curable siloxane composition according to claim 20 in which the organotitanate is tetrabutyltitanate.

23. The ultraviolet radiation curable siloxane composition according to claim 22 in which adhesion promoter (II) is present in an amount of from 0.15 to 3.5 weight percent based on the weight of mixture (I).

* * * * *